Aug. 12, 1930.
C. F. JENKINS
GRID LEAK CELL CIRCUIT
Re. 17,766
Original Filed Oct. 22, 1924
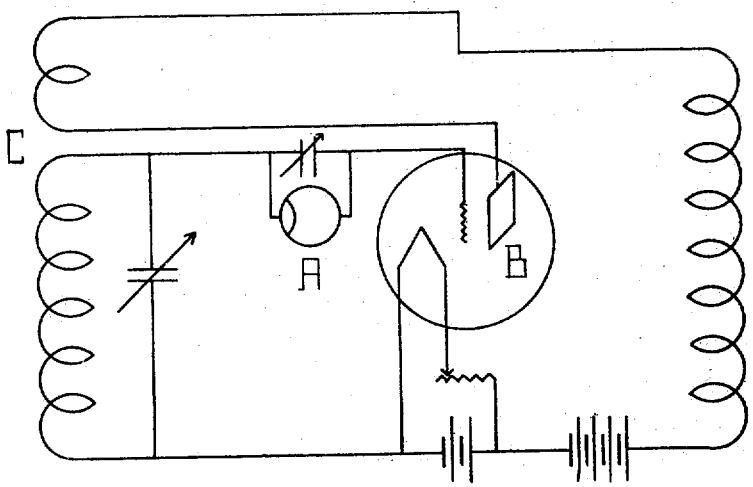
Inventor
C. Francis Jenkins Reissued Aug. 12, 1930

Re. 17,766

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

GRID-LEAK CELL CIRCUIT

Original No. 1,667,384, dated April 24, 1928, Serial No. 745,211, filed October 22, 1924. Application for reissue filed January 30, 1930. Serial No. 424,700.

This invention relates to radio circuits in which a light-sensitive cell takes the place of a grid leak in an oscillation generator circuit, and has for its principal object such an adjustment of the component parts as will stop and start oscillation in accord with the light and dark condition of the cell.

With this and other objects, the invention consists of the employment and arrangement of the several elements described in the following specifications, illustrated in the drawing, and particularly pointed out in the claims.

In the drawings A is a light sensitive cell; B a three-element tube; and C as oscillation-generating coupling coil.

With the several parts adjusted for oscillation of the circuit when light falls on the cell, the oscillation will instantly cease when the light is cut off, because of the increase in the resistance of the cell. The output of the oscillating circuit is, therefore, intermittent, the intermittence depending upon the order of the light falling on the cell.

No means for intermittently illuminating the cell is shown as this is no part of the invention and not essential to an understanding of its operation.

What is claimed is:

1. The combination with an electron valve, of a circuit including input and return conductors connected respectively with the grid and filament electrodes of the valve, a variable stopping condenser in series with said input conductor, and a resistance leak in said input conductor shunted about the condenser and comprising a light sensitive cell.

2. The method of operating an electron discharge device to produce interrupted radio frequency wave trains which includes the step of intermittently exposing a light sensitive grid leak to light, to control cessation of oscillations in said device.

3. The method of starting and stopping oscillations from an electron discharge oscillator having a condenser in series with the grid of said oscillator, which comprises shunting said condenser with a light responsive device and adjusting the values of said condenser so that when light falls on said device oscillations are started and when light is cut off said device ceases oscillating.

4. In combination with an electron discharge device of circuit connections for causing said device to generate oscillations and oscillation control means comprising a condenser connected between one end of an input coil and the grid of said device, and a light sensitive device shunted about said condenser.

5. The combination according to claim 4 in which said condenser is variable.

6. In combination, an electron discharge device having an input circuit and an output circuit, means for feeding back energy from said output circuit to said input circuit, and a light-sensitive cell grid leak for said oscillator in series with the input circuit to control the starting and stopping of oscillations in accordance with signals.

7. In combination, an electron discharge oscillator of the feed back type, and a light-sensitive cell grid leak connected in series with the input circuit of said oscillator.

In testimony whereof I have hereunto set my hand on this 25th day of March, 1930.

CHARLES FRANCIS JENKINS.